(12) United States Patent
Doherty et al.

(10) Patent No.: US 12,181,202 B2
(45) Date of Patent: Dec. 31, 2024

(54) THERMAL CONNECTION ASSEMBLIES AND METHODS

(71) Applicant: Montana Instruments Corporation, Bozeman, MT (US)

(72) Inventors: Josh Doherty, Bozeman, MT (US); Jamesen Motley, Bozeman, MT (US); William Baker, Broomfield, CO (US); Joseph Evers, Bozeman, MT (US); Benjamin Hardesty, Belgrade, MT (US); Anjan Reijnders, Groton, MA (US)

(73) Assignee: Montana Instruments Corporation, Bozeman, MT (US)

( * ) Notice: Subject to any disclaimer, the term of this patent is extended or adjusted under 35 U.S.C. 154(b) by 1012 days.

(21) Appl. No.: 16/892,266

(22) Filed: Jun. 3, 2020

(65) Prior Publication Data
US 2020/0386470 A1 Dec. 10, 2020

Related U.S. Application Data

(60) Provisional application No. 62/857,235, filed on Jun. 4, 2019.

(51) Int. Cl.
*F25D 19/00* (2006.01)
*F25D 3/10* (2006.01)
*G01D 11/24* (2006.01)

(52) U.S. Cl.
CPC ............ *F25D 19/006* (2013.01); *F25D 3/10* (2013.01); *G01D 11/245* (2013.01)

(58) Field of Classification Search
CPC ....... F25D 19/006; F25D 3/10; G01D 11/245; B01L 7/50; B01L 2300/185; B01L 2300/1894
See application file for complete search history.

(56) References Cited

U.S. PATENT DOCUMENTS 3,415,077 A 12/1968 Collins
3,613,387 A 10/1971 Collins
(Continued)

FOREIGN PATENT DOCUMENTS

CN 107906844 A 4/2018
DE 102018130882 A1 6/2019
(Continued)

OTHER PUBLICATIONS

Machine translation for JP-61068547-A (Year: 1986).*
(Continued)

*Primary Examiner* — Joseph F Trpisovsky
(74) *Attorney, Agent, or Firm* — Wells St. John P.S.

(57) ABSTRACT

Cryogenic analysis systems are provided that can include: a cryogenic fluid source component; an analysis component; and a thermal connection assembly operably engaged with both the cryogenic fluid source component and the analysis component to provide disengagement or engagement of the cryogenic fluid source component to/from the analysis component while maintaining the cooling status of the cryogenic fluid source component. Methods for performing sample analysis under cryogenic conditions are provided, the methods comprising: providing an analysis component; providing a cryogenic fluid source component having cryogenic fluid in a cold state; operably engaging the analysis component and the cryogenic fluid source component; preparing a sample for analysis within the analysis component; and while maintaining the cryogenic fluid in the cold state, disengaging the cryogenic fluid source component from the analysis component.

12 Claims, 19 Drawing Sheets

(56) References Cited

U.S. PATENT DOCUMENTS

| | | |
|---|---|---|
| 4,242,885 A | 1/1981 | Quack et al. |
| 4,279,127 A | 7/1981 | Longsworth |
| 4,543,794 A | 10/1985 | Matsutani et al. |
| 4,713,942 A | 12/1987 | Hofmann |
| 4,745,760 A | 5/1988 | Porter |
| 4,757,261 A | 7/1988 | Kneip, Jr. |
| 4,790,147 A | 12/1988 | Kuriyama et al. |
| 4,848,093 A | 7/1989 | Simmonds et al. |
| 5,485,731 A | 1/1996 | Venetucci et al. |
| 5,552,608 A | 9/1996 | Gallagher et al. |
| 5,584,184 A | 12/1996 | Inaguchi et al. |
| 5,647,228 A | 7/1997 | Sager et al. |
| 5,665,314 A | 9/1997 | Berger et al. |
| 5,755,715 A | 5/1998 | Stern et al. |
| 5,936,499 A | 8/1999 | Eckels |
| 5,979,176 A | 11/1999 | Stables et al. |
| 6,196,005 B1 | 3/2001 | Stautner |
| 6,263,677 B1 | 7/2001 | Hafner et al. |
| 6,280,688 B1 | 8/2001 | Motz |
| 6,336,332 B1 | 1/2002 | Cohu |
| 6,427,778 B1 | 8/2002 | Beall et al. |
| 8,671,698 B2 | 3/2014 | Wang |
| 8,746,008 B1 | 6/2014 | Mauritsen et al. |
| 9,618,257 B2 | 4/2017 | Black et al. |
| 10,165,667 B1 | 12/2018 | Christiansen et al. |
| 10,775,285 B1 | 9/2020 | Baker et al. |
| 10,785,891 B1 | 9/2020 | Monroe et al. |
| 11,047,779 B2 | 6/2021 | Doherty et al. |
| 11,125,663 B1 | 9/2021 | Henslee et al. |
| 11,125,664 B2 | 9/2021 | Doherty et al. |
| 11,150,169 B2 | 10/2021 | Reijnders et al. |
| 11,248,996 B2 | 2/2022 | Doherty et al. |
| 11,275,000 B2 | 3/2022 | Doherty et al. |
| 11,309,110 B2 | 4/2022 | Mine et al. |
| 11,480,299 B1 | 10/2022 | Najafi-Yazdi et al. |
| 2001/0023592 A1 | 9/2001 | Odawara et al. |
| 2003/0177814 A1 | 9/2003 | Weckstrom |
| 2004/0187519 A1 | 9/2004 | Zhu et al. |
| 2005/0067159 A1 | 3/2005 | Hall et al. |
| 2005/0229609 A1 | 10/2005 | Kirichek et al. |
| 2009/0094992 A1 | 4/2009 | Wang |
| 2009/0195980 A1 | 8/2009 | Shih |
| 2009/0199579 A1 | 8/2009 | Kundig |
| 2010/0050661 A1 | 3/2010 | Snow et al. |
| 2011/0219785 A1 | 9/2011 | Black et al. |
| 2012/0011859 A1 | 1/2012 | Black et al. |
| 2012/0096873 A1 | 4/2012 | Webber et al. |
| 2013/0021032 A1 | 1/2013 | Heiss et al. |
| 2013/0047633 A1 | 2/2013 | Leach et al. |
| 2013/0179090 A1 | 7/2013 | Conroy |
| 2014/0202174 A1 | 7/2014 | Wang |
| 2014/0245757 A1 | 9/2014 | Garside et al. |
| 2015/0300719 A1 | 10/2015 | Strickland et al. |
| 2015/0332829 A1 | 11/2015 | Stautner et al. |
| 2015/0355091 A1 | 12/2015 | Conroy |
| 2016/0123537 A1 | 5/2016 | Heiss et al. |
| 2017/0168121 A1 | 6/2017 | Yu et al. |
| 2017/0323764 A1 | 11/2017 | Muto et al. |
| 2019/0162777 A1 | 5/2019 | Chiang et al. |
| 2019/0170620 A1 | 6/2019 | Reijnders et al. |
| 2019/0170623 A1 | 6/2019 | Doherty et al. |
| 2019/0170624 A1* | 6/2019 | Doherty .................. G01N 1/44 |
| 2020/0149686 A1 | 5/2020 | Neils et al. |
| 2020/0265963 A1 | 8/2020 | Wong |
| 2021/0005366 A1 | 1/2021 | Doherty et al. |
| 2021/0278745 A1 | 9/2021 | Groeblacher et al. |
| 2021/0326739 A1 | 10/2021 | Jeffrey |
| 2022/0092459 A1 | 3/2022 | Bogorin et al. |
| 2022/0237495 A1 | 7/2022 | Yohannes et al. |
| 2023/0155593 A1 | 5/2023 | Abdo et al. |

FOREIGN PATENT DOCUMENTS

| | | | |
|---|---|---|---|
| FR | 3023900 A1 | 1/2016 | |
| GB | 2457054 A | 8/2009 | |
| GB | 2566024 A | 3/2019 | |
| JP | 61068547 A * | 4/1986 | ............ G01N 25/00 |
| WO | WO 2018/168304 | 2/2018 | |

OTHER PUBLICATIONS

Wang et al., "A Compact Cold Helium Circulation System with GM Cryocooler", 2014, United States, 6 pages.

http://coldedgetech.com/stinger; ColdEdge Technologies, Jun. 11, 2017; United States; 6 pages.

RC102-CFM Microscopy Cryostat System Brochure, Cryo Industries of America, Inc., Sep. 3, 2013; United States, 14 pages.

* cited by examiner

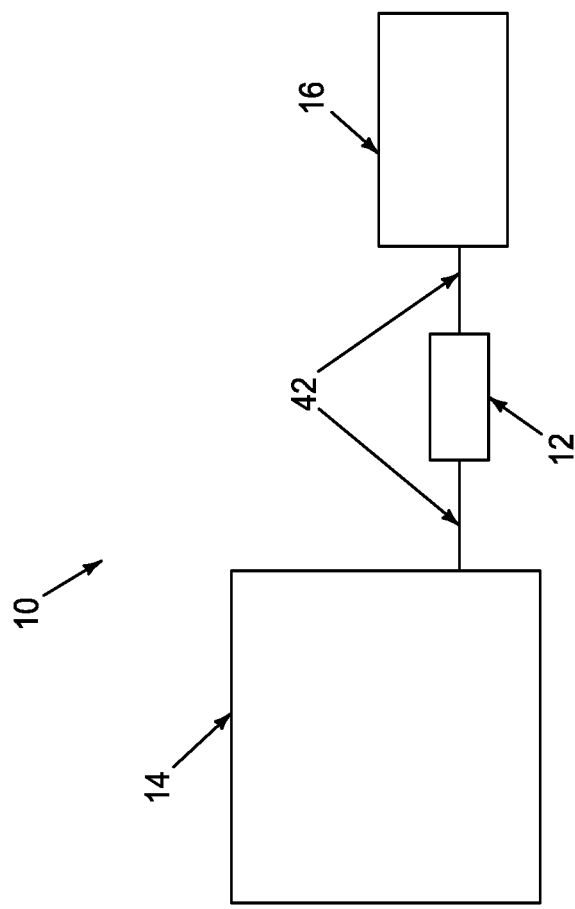

THERMAL CONNECTION ASSEMBLIES AND METHODS

CROSS REFERENCE TO RELATED APPLICATION

This application claims priority to and the benefit of U.S. Provisional Patent Application Ser. No. 62/857,235 filed Jun. 4, 2019 entitled "Thermal Connection Assemblies and Methods", the entirety of which is incorporated by reference herein.

TECHNICAL FIELD

The present disclosure relates to analysis components, assemblies and methods that can be used to facilitate the maintenance of thermal components within an analytical system that provides thermal conditions to samples during analysis. The present disclosure has particular usefulness in the analytical art that utilizes cryogenic cooling.

BACKGROUND

Analysis instruments can provide a specific environment for the sample to be analyzed. It is often of interest to cryogenically cool an analysis component of an analysis instrument. This can be readily accomplished by attaching the analysis component to a cryogenic cooling source. In existing technologies, a cryogenic cooling source component and the analysis component of the analytical instrument are located within the same pressurized space and/or not thermally isolated from one another. This dictates that the cryogenic cooling component must have its desired environment prepared each time a sample is changed out for another sample. Because the cryogenic cooling source component is often large in size and mass, existing technologies take an undesirably long time to prepare the analysis component upon analysis of a new sample. Additionally, because the cryogenic cooling source component and analysis component are physically and/or operationally part of the same system, existing technologies make it difficult to attach a different analysis component to the same cryogenic cooling source component. Thermal connection assemblies and methods are needed for analytical instruments that allow for either or both cooling source components and/or analysis components to be quickly, easily, and reliably connected to and disconnected from one another.

SUMMARY

Cryogenic analysis systems are provided that can include: a cryogenic fluid source component; an analysis component; and a thermal connection assembly operably engaged with both the cryogenic fluid source component and the analysis component to provide disengagement or engagement of the cryogenic fluid source component to/from the analysis component while maintaining the cooling status of the cryogenic fluid source component.

Methods for performing sample analysis under cryogenic conditions are provided, the methods comprising: providing an analysis component; providing a cryogenic fluid source component having cryogenic fluid in a cold state; operably engaging the analysis component and the cryogenic fluid source component; preparing a sample for analysis within the analysis component; and while maintaining the cryogenic fluid in the cold state, disengaging the cryogenic fluid source component from the analysis component.

DRAWINGS

Embodiments of the disclosure are described below with reference to the following accompanying drawings.

FIG. 1A is a cryogenic analysis system according to an embodiment of the disclosure.

DESCRIPTION

Figure 1B:
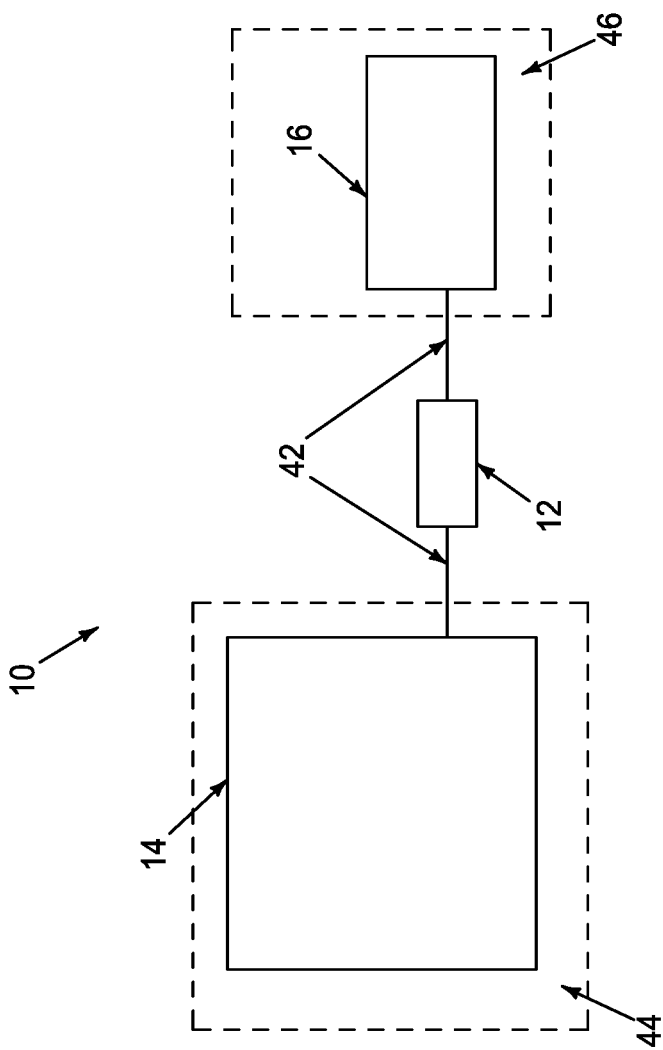
FIG. 1B is a cryogenic analysis system according to another embodiment of the disclosure.

This disclosure is submitted in furtherance of the constitutional purposes of the U.S. Patent Laws "to promote the progress of science and useful arts" (Article 1, Section 8).

The thermal connection assemblies and methods of the present disclosure will be described with reference to FIGS. 1A-11. Referring first to FIG. 1A, an analytical instrument such as a cryogenic analysis system 10 can include a thermal connection assembly 12 that can be configured and used according to methods disclosed herein as an interface between a cryogenic fluid source component 14 and an analysis component 16. In many existing cryogenic systems, such as cryostats, the source of cryogenic fluid (i.e. the "cold source") such as liquid and/or gas helium or nitrogen and the analysis components are located within a shared vacuum space and sold as single systems. The thermal connection assembly 12 allows for separation (thermal and physical) of the "cold source" from the analysis component.

Thermal connection assembly 12 is in thermal communication with the cryogenic fluid source component 14 and the analysis component 16 via thermal conduits that can allow thermal connection assembly 12 to transfer cooling power from cryogenic fluid source component 14 to analysis component 16. Thermal connection assembly 12 can allow for the thermal communication between analysis component 16 and cryogenic fluid source component 14 to be turned on and off by connecting and disconnecting, respectively, the connection of the analysis component 16 to the thermal connection assembly 12.

In accordance with an example implementation, the cryogenic cooling component 14 and the analysis component 16 can exist in separate pressure (i.e. vacuum) spaces. The thermal connection assembly 12 can exist on either side of a pressure barrier separating these spaces and/or in its own pressure space. This configuration enables the temperature of the analysis component 16 and the pressure of the analysis component vacuum space 46 be controlled independently from that of the cryogenic cooling component 14.

Additionally, cryogenic fluid source component 14 operation and state (temperature, cooling power, etc.) do not depend on the state of the analysis component 16. In accordance with example implementations, these unique features allow analysis component 16 to be easily disconnected from the thermal connection assembly 12, and further, different analysis components 16 can be provided to quickly and reliably connect to a cooling source. Still additional embodiments can be used where analysis component 16 can be warmed up, vented, evacuated, and cooled back down without needing to warm up the cryogenic fluid source component 14, thereby further facilitating rapid exchange of samples.

Figure 1C:
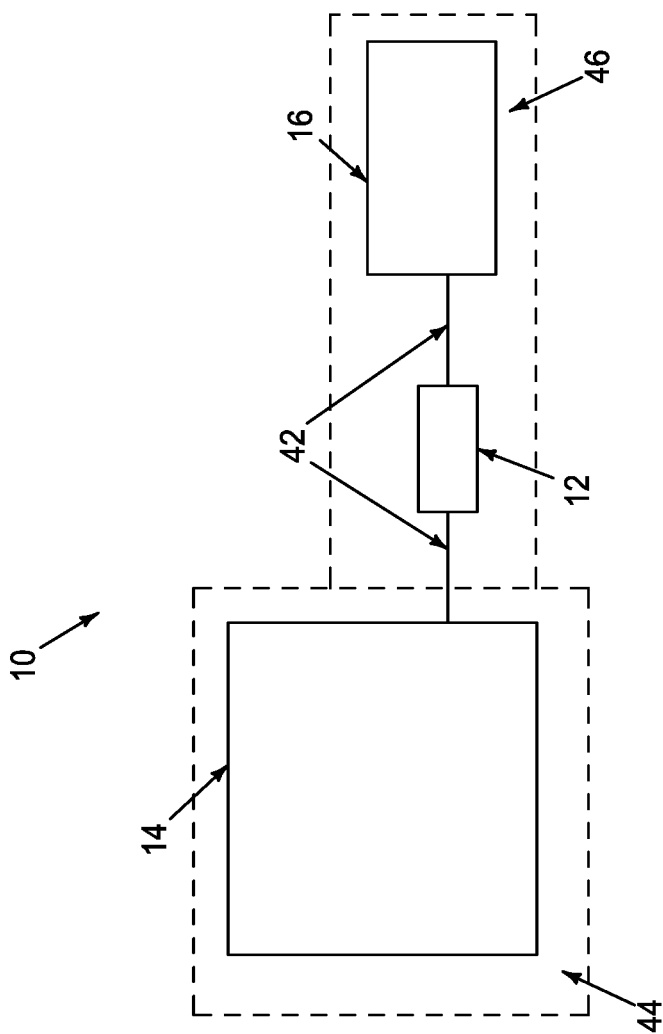
FIG. 1C is a cryogenic analysis system according to another embodiment of the disclosure.
Figure 1D:
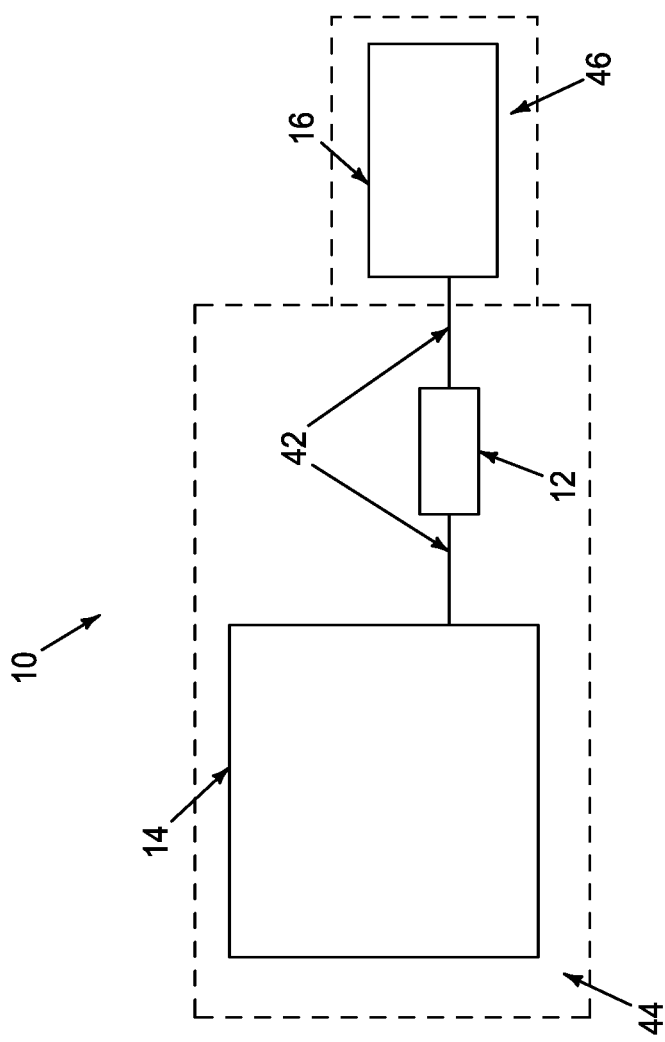
FIG. 1D is a cryogenic analysis system according to another embodiment of the disclosure.

Referring next to FIG. 1B, vacuum space 44 defined by a housing can be part of cryogenic fluid source component 14. Also, vacuum space 46 defined by a housing can be part of analysis component 16. Referring to FIG. 1C, space 46 can also be defined by a housing that encompasses both analytical component 16 as well as thermal transfer assembly 12. Referring to FIG. 1D, space 44 can be defined by a housing that encompasses both fluid source component 14 and thermal transfer assembly 12. In accordance with example implementations, these vacuum spaces can be distinct from one another in that each can be maintained at different pressures other than atmospheric pressure. It is also contemplated that thermal transfer assembly 12 includes a separate housing that defines a separate pressurized space for assembly 12. Within these cryogenic analysis systems, vacuum, particularly extraordinarily low vacuum pressures are used to lower, if not remove, heat transfer through air, such as convection.

Figure 2A:
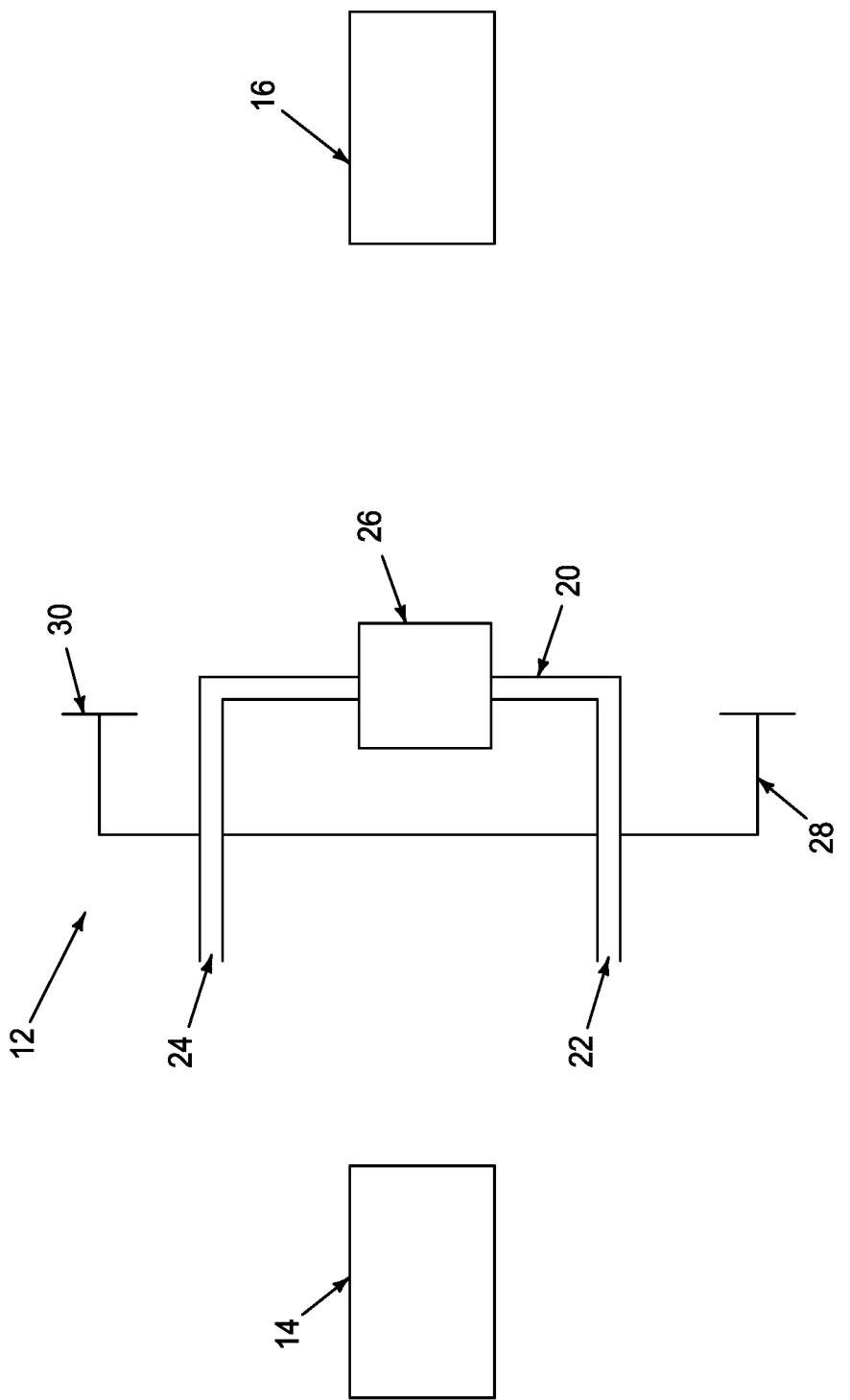
FIG. 2A is an example thermal connection assembly according to an embodiment of the disclosure.

Referring next to FIG. 2A, a more detailed view of one embodiment of the disclosure shows the basic components of thermal connection assembly 12. Assembly 12 can include a cryogenic fluid conduit 20. Conduit 20 can be configured to provide cryogenic fluid to be transported into and out of the thermal connection assembly 12. In accordance with example implementations, cryogenic fluid conduit 20 can include an inlet end 22 that receives cryogenic fluid from cryogenic fluid source component 14 into thermal connection assembly 12. Conduit 20 also includes an exhaust end 24 that transfers cryogenic fluid out of thermal connection assembly 12. Exhaust end 24 of cryogenic fluid conduit 20 may connect to downstream gas handling components including a pump or compressor. Cryogenic fluid conduit 20 could be, for example, a continuous conduit that begins at cryogenic fluid source component 14, runs through thermal connection assembly 12, and then to a gas handling unit in a closed-cycle analytical instrument system. The cryogenic fluid conduit could also be a section of conduit that attaches to intermediate conduits located between the thermal connection assembly 12 and any upstream component, such as the cryogenic fluid source component 14, or downstream component, such as gas handling equipment. Cryogenic fluid conduit 20 can connect to any upstream or downstream component or intermediate conduit via mechanical connections, for example VCR fittings that seal with a crush washer. Cryogenic fluid conduit 20, for example, can be constructed of a stainless-steel tube with a thin wall to reduce heat transfer through the walls of the conduit.

Thermal connection assembly 12 can also include thermal mass 26 in thermal communication with analysis component 16 and cryogenic fluid source component 14. Thermal mass 26 can be in thermal communication with cryogenic fluid conduit 20, which can facilitate thermal mass 26 being cooled by delivering cryogenic fluid from cryogenic fluid source component 14 to the thermal connection assembly 12.

Thermal mass 26 can be in thermal communication with analysis component 16 via a solid conduction pathway. This can be achieved, for example, by attaching the analysis component 16 or a thermal conduit in thermal communication with analysis component 16 to thermal mass 26 by a bolted connection or a soldered or epoxied joint, for example. Thermal mass 26 could also be in thermal communication with analysis component 16 via an independent cryogenic fluid conduit from thermal mass 26 to analysis component 16. Thermal mass 26 may include or be attached to a heater to raise its temperature as well. Thermal mass 26 may include or be attached to a thermometer to measure its temperature as well. The temperature of thermal mass 26 may also be controlled using a PID controller or other control loop mechanism.

Thermal connection assembly 12 can include a vacuum housing 28. Vacuum housing 28 can include a barrier that physically separates the vacuum space of thermal connection assembly 12 from other spaces. For example, vacuum housing 28 can be a physical barrier that forms a vacuum-tight seal around the input fluid feedthrough and exhaust fluid feedthrough, or conduit 20.

Thermal connection assembly 12 can also include a vacuum sealing component 30. Vacuum sealing component 30 can be configured to allow a separate chamber to be attached to vacuum housing 28 of thermal connection assembly 12. In accordance with at least one implementation, a vacuum tight seal can be formed around the space in which thermal mass 26 of thermal connection assembly 12 is located. Vacuum sealing component 30 can be an o-ring sealing surface, for example. Component 30 could also be most types of vacuum compatible fittings or flanges, such as a KF or Conflat flange, for example.

Figure 2B:
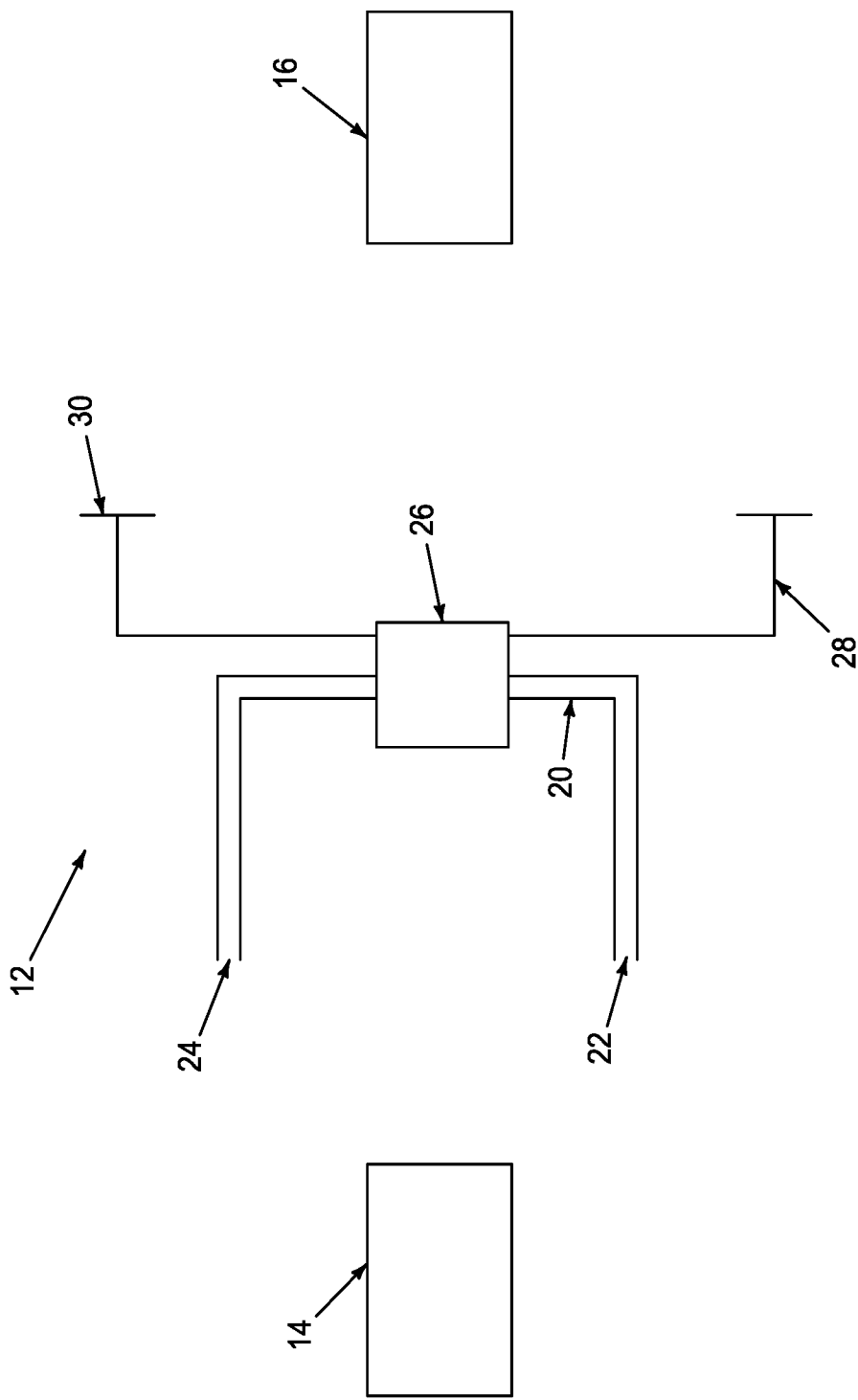
FIG. 2B is an example connection assembly according to another embodiment of the disclosure.

In accordance with example implementations, FIG. 2A depicts cryogenic fluid conduit 20 crossing vacuum housing 28 of thermal connection assembly 12 with thermal mass 26 on analysis component 16 side of vacuum housing 28. As depicted in FIG. 2B, cryogenic fluid conduit 20 may also be predominantly located on cryogenic fluid source component 14 side of the vacuum housing 28 with only a portion of thermal mass 26 engaging thermal connection assembly 12 of vacuum housing 28.

Figure 3A:
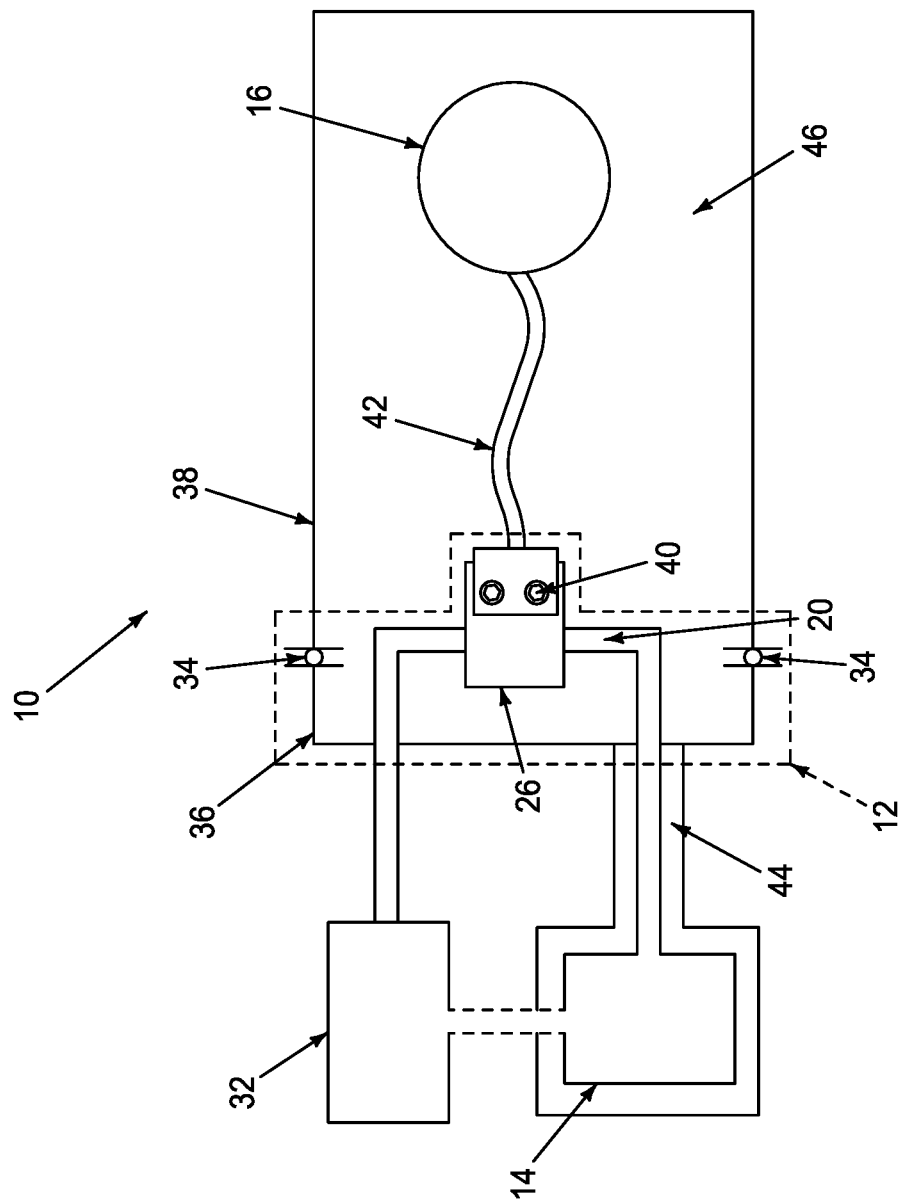
FIG. 3A is a cryogenic analysis system according to an embodiment of the disclosure.

Referring next to FIG. 3A, a depiction of an analytical instrument 10 is shown that depicts a basic configuration of thermal connection assembly 12 used to cool analysis component 16 with a cryogenic fluid source component 14. Cryogenic fluid conduit 20 is a continuous conduit that transfers cryogenic fluid from cryogenic fluid source component 14, through thermal connection assembly 12, and to a gas handling unit 32. Cryogenic fluid source component 14 could include for example a dewar of liquid cryogen and/or a liquefier assembly that cools warm gas into cold gas and possibly condenses it into cryogenic liquid. Gas handling unit 32 can, for example, contain a pump that creates a low pressure to drive the cryogenic fluid flow. An o-ring 34 between thermal connection vacuum housing 36 and analysis component vacuum housing 38 can provide an interior space (the analysis component vacuum space) that can be pumped out to vacuum pressures using a pump. As shown, analysis component 16 is in thermal communication with thermal connection assembly 12 via a bolted connection 40 between thermal mass 26 of thermal connection assembly 12 and a thermal conduit 42 attached to analysis component 16.

Figure 3B:
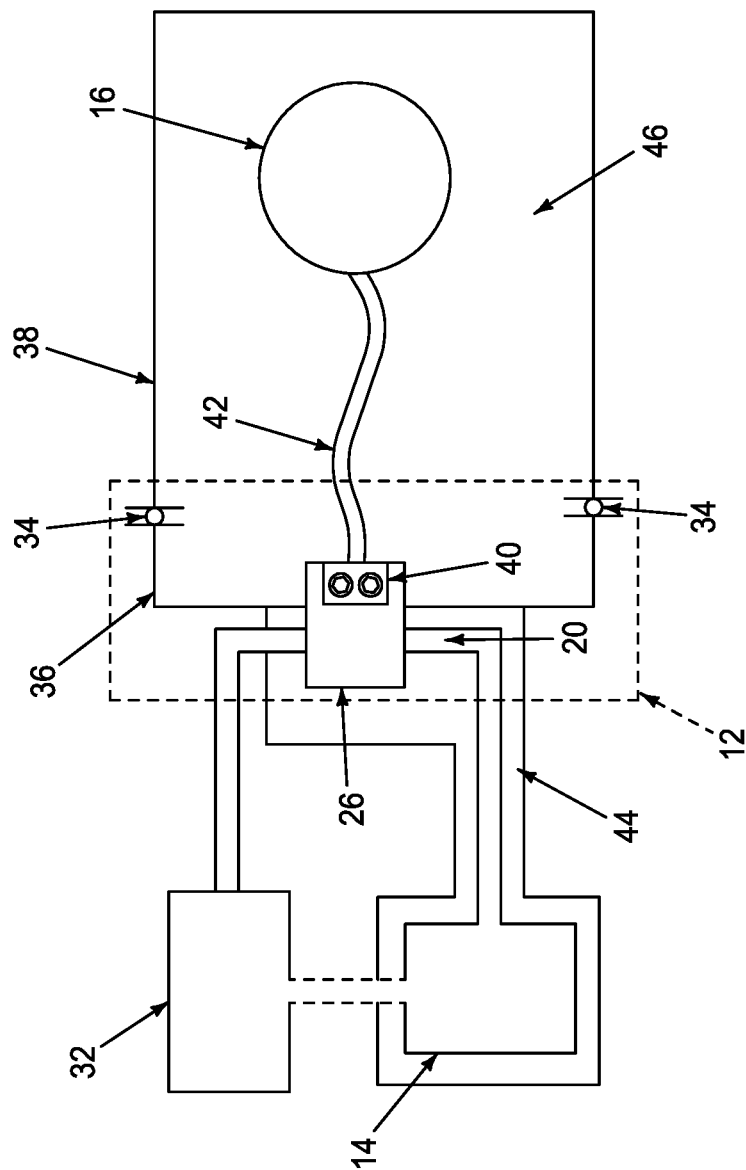
FIG. 3B is a cryogenic analysis system according to another embodiment of the disclosure.

FIG. 3A depicts cryogenic fluid conduit 20 crossing thermal connection vacuum housing 36, with a portion of cryogenic fluid conduit 20 in a cryogenic fluid source vacuum space 44 and another portion in an analysis component vacuum space 46. In accordance with an example implementation, thermal mass 26 is located entirely in analysis component vacuum space 46. As shown in FIG. 3B, in accordance with another embodiment of the disclosure, cryogenic fluid conduit 20 may be predominantly located in cryogenic fluid source component vacuum space 44 (i.e. not crossing the vacuum housing 36) with a portion of thermal mass 26 in each of cryogenic fluid source component vacuum space 44 and analysis component vacuum space 46.

With cryogenic fluid in cryogenic fluid source component 14, the analysis component 16 shown in FIG. 3A and FIG. 3B can be cooled. The analysis component vacuum space 46 can be evacuated with a vacuum pump. A pump in gas handling unit 32 can be turned on to 'pull' cryogenic fluid from the cryogenic fluid source 14, into thermal connection assembly 12, and out to gas handling unit 32. As cryogenic fluid flows through thermal connection assembly 12, thermal mass 26, which is in thermal communication with the cryogenic fluid conduit cools. As thermal mass 26 cools, so does analysis component 16 that is in thermal communication with thermal mass 26 via bolted connection 40. To exchange analysis component 16 or for example a sample of interest provided in analysis component 16, heaters attached to or installed on thermal mass 26 of thermal connection assembly 12 or analysis component 16 can be turned on.

The processes described above are at least some the embodiments of the present disclosure that provide for the engagement/disengagement of components. Upon engagement of components, a vacuum space is provided that is distinct from other vacuum spaces in other components. For example, thermal connection assembly 12, assembly 12 and component 14, and/or assembly 12 and component 16; may be engaged/disengaged with either or both of component 14 and/or 16, with component 16, and/or with component 14 respectively. This engagement/disengagement can seal or unseal a vacuum space.

In accordance with another implementation, the flow of cryogenic fluid into thermal connection assembly 12 can be stopped by turning off the pump in gas handling unit or system 32, or inducing a vapor lock within cryogenic fluid conduit 20. Once warm, analysis component vacuum space 46 can be vented such that analysis component vacuum space 46 is equal to atmospheric pressure. Analysis component vacuum housing 38 can then be opened and the sample exchanged. After closing analysis component vacuum housing 38, the analysis component vacuum space 46 can be evacuated using a vacuum pump. Any heaters turned on during the warmup can be turned off and the flow of cryogenic fluid from cryogenic fluid source component 14, through thermal connection assembly 12, and to gas handling unit 32 can resume to cool not only thermal mass 26 in thermal connection assembly 12, but also analysis component 16 in thermal communication with thermal mass 26. Because cryogenic fluid source component 14 can remain cold, even when analysis component 16 is warmed up and vented, cryogenic fluid remains available for subsequent cooldowns of the analysis component 16 allowing the new sample to be cooled down relatively fast.

Figure 4A:
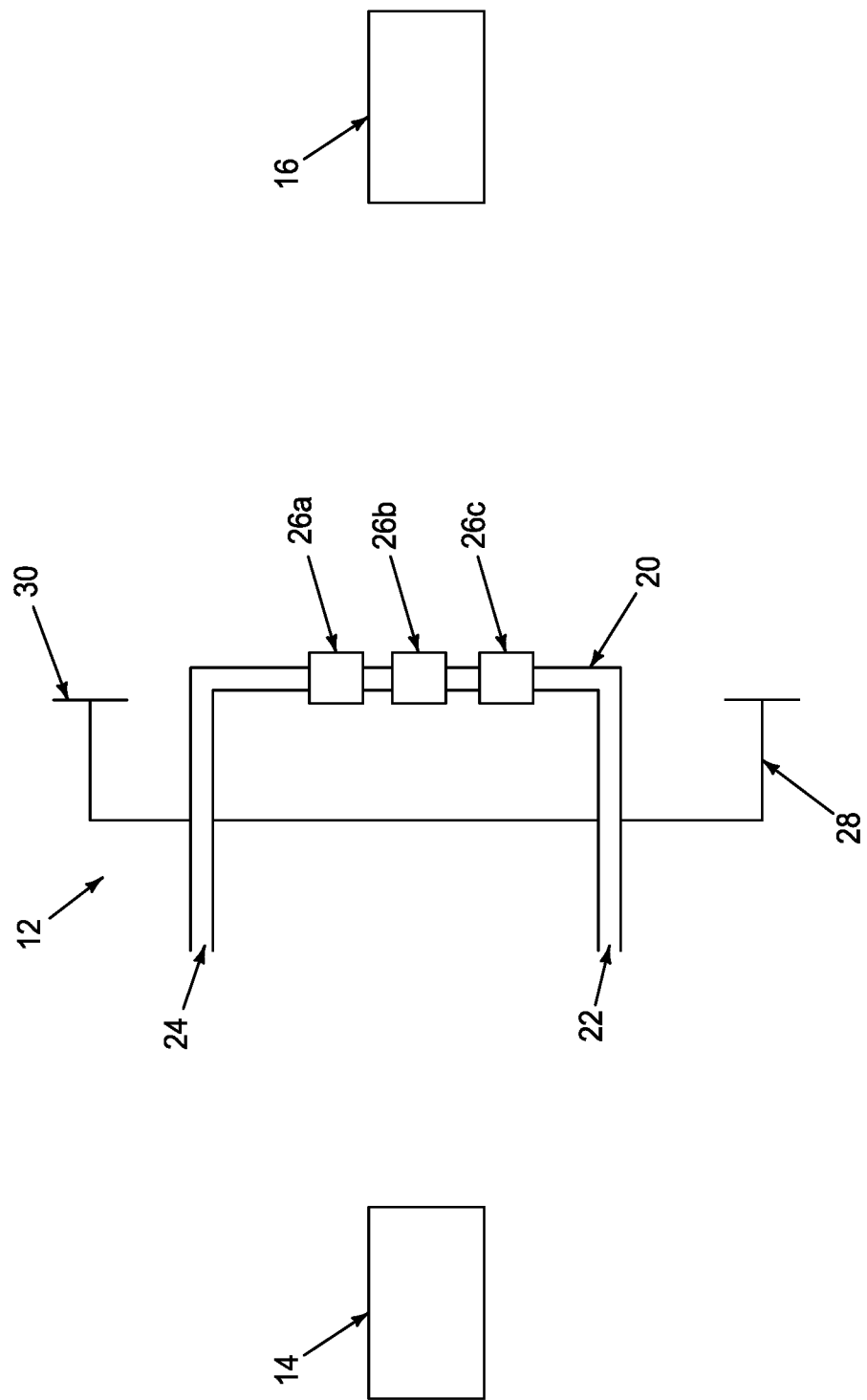
FIG. 4A is an example thermal connection assembly according to an embodiment of the disclosure.
Figure 4B:
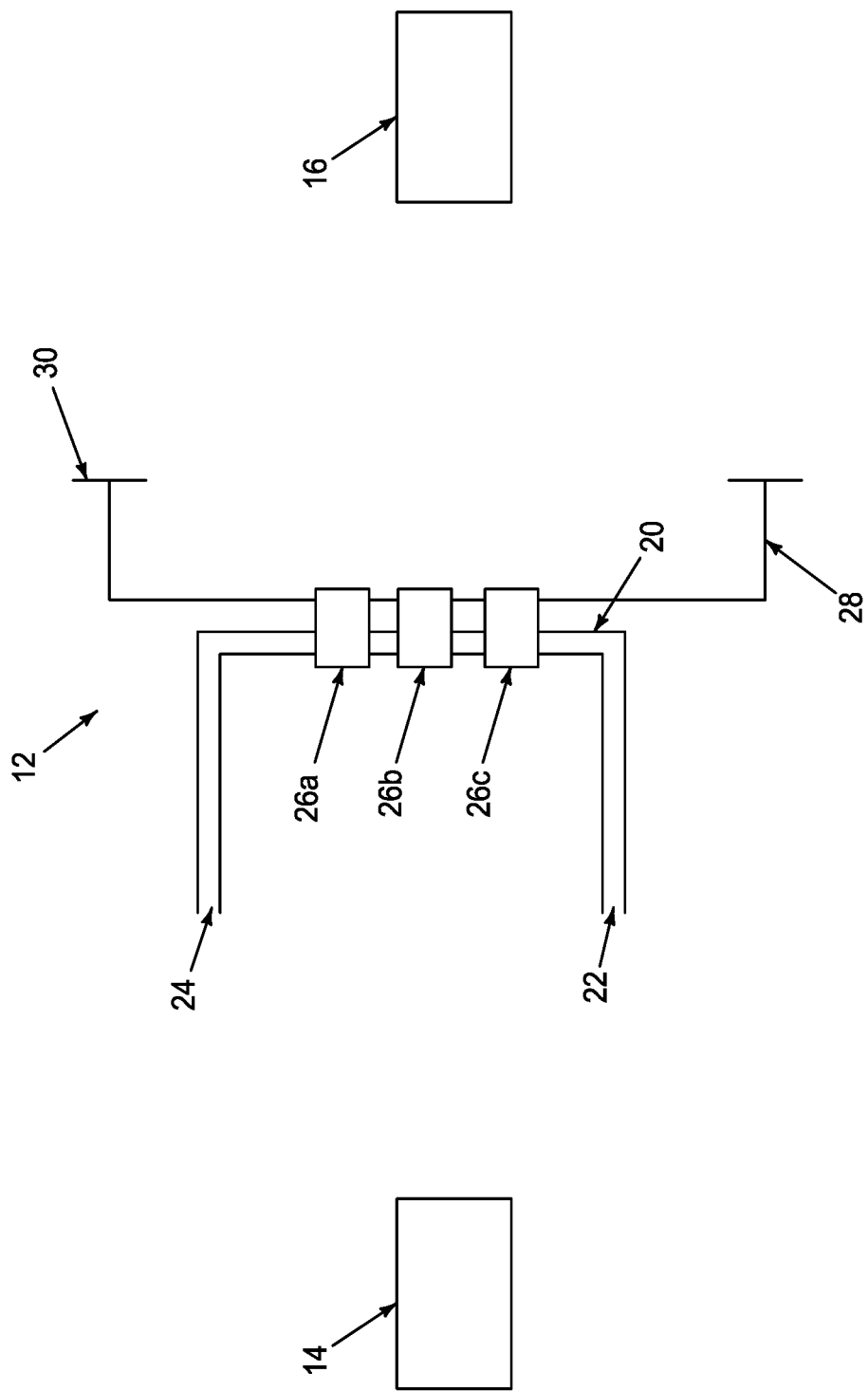
FIG. 4B is a thermal connection assembly according to another embodiment of the disclosure.

Referring next to FIG. 4A, another embodiment of thermal connection assembly 12 is depicted that includes a plurality of thermal masses 26a, 26b, and 26c. While three are shown, only two may be provided, as well as more than the three shown. The thermal masses may include a convenient thermal connection, such as a common bolt hole pattern, allowing multiple components of interest in an analysis component 16 to be easily, quickly, and reliably connected to and disconnected from the thermal connection assembly 12. Cryogenic fluid conduit 20 is depicted in FIG. 4A crossing vacuum housing 28 of thermal connection assembly 12 with the thermal masses (26a, 26b, and 26c) on analysis component 16 side of vacuum housing 28. As shown in FIG. 4B, cryogenic fluid conduit 20 may also be predominately located on cryogenic fluid source component 14 side of vacuum housing 28 with only a portion of thermal masses (26a, 26b, and 26c) crossing vacuum housing 28. These masses may be defined by discrete portions of conduit 20 as well.

Figure 5:
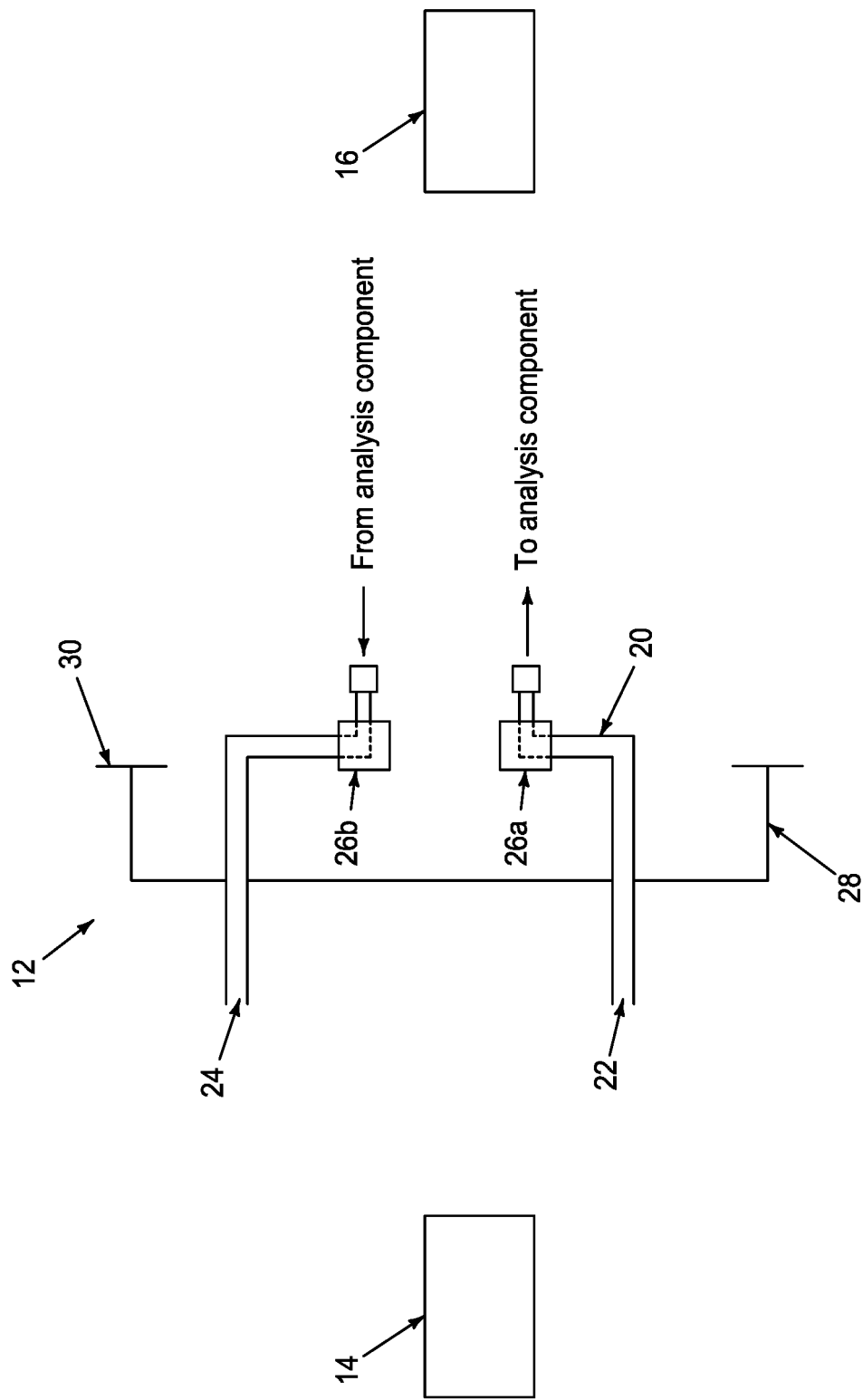
FIG. 5 is a thermal connection assembly according to an embodiment of the disclosure.

Referring to FIG. 5, yet another embodiment of thermal connection assembly 12 is depicted that provides thermal communication between a thermal mass 26a of thermal connection assembly 12 to analysis component 16 via the transfer of cryogenic fluid from thermal mass 26a to analysis component 16. These connections could be a VCR connection for example consisting of a crush washer that seals between threaded male and female fittings.

Analogous to the use of different lenses on a camera, thermal connection assemblies and methods can provide for the attachment and use of a variety of analysis components that are compatible with the vacuum sealing component of the thermal connection assembly. For example, depending on the unique need of the user, analysis components of different size, shape, or function can be used. This greatly broadens the utility of the cryogenic fluid source component. The thermal connection assembly can be of varying size and geometry. While not explicitly shown herein, the thermal masses of the thermal connection assembly could for example be oriented in a concentric fashion or nested around each other. The thermal connection assembly can be mechanically de-coupled from the cryogenic fluid source component, which could ultimately reduce the vibrations transferred from components in the cryogenic fluid source component, for example a cryocooler used to liquefy cryogenic fluid, to the analysis component.

The analysis component can be attached to the thermal connection assembly in any way that provides good thermal communication. The bolted connection shown in FIG. 3A and FIG. 3B is one embodiment, but others may include a high force or high friction joint, for example a dovetail.

With regard to the embodiment depicted in FIG. 5, cryogenic fluid conduit 20 is not contiguous through the thermal mass(es) 26. Specifically, in FIG. 5 cryogenic fluid flows from one thermal mass 26a to an analysis component; whereas the other embodiments show the cryogenic fluid flowing from thermal mass 26a to another thermal mass 26b.

Figure 6A:
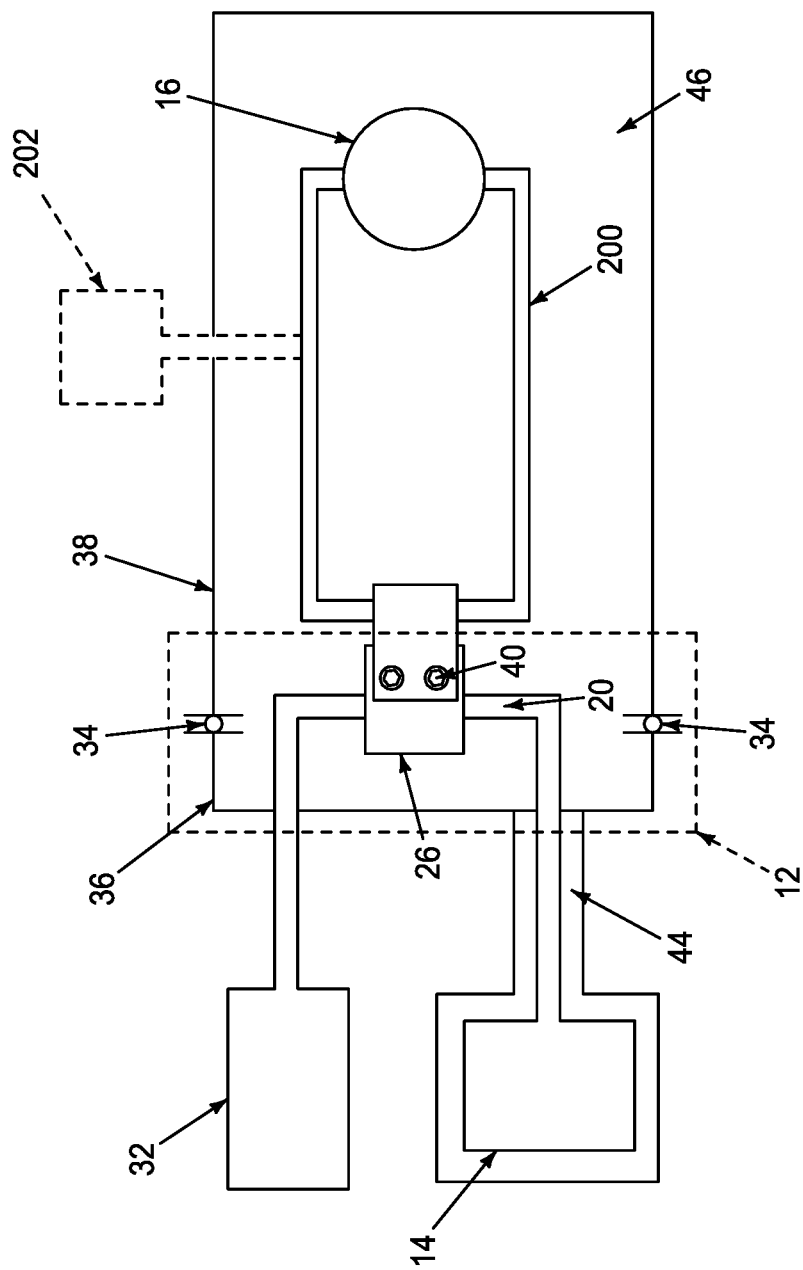
FIG. 6A is a cryogenic analysis system according to an embodiment of the disclosure.

Referring next to FIG. 6A, another embodiment of instrument 10 is shown that includes thermal connection assembly 12 with analysis component 16 having a secondary cryogenic fluid conduit 200. Secondary cryogenic fluid conduit 200 can be independent from the cryogenic fluid conduit 20. Secondary cryogenic fluid conduit 200 may contain a separate gas handling unit 202, that is independent from gas handling unit 32. Secondary cryogenic fluid conduit 200 is in thermal communication with a secondary thermal mass; which could be a separate mass or an extension/continuation/portion of the secondary thermal conduit. The secondary thermal mass can be in thermal communication with the thermal mass 26 of the thermal connection assembly 12 via a bolted connection 40. As separate conduits, the cryogenic fluid within the cryogenic fluid conduit 20 may be different from the cryogenic fluid within the secondary cryogenic fluid conduit 200. For example, the secondary cryogenic fluid conduit may contain Helium-3 that is pre-cooled via the thermal connection assembly 12 before it is delivered to the analysis component 16.

Figure 6B:
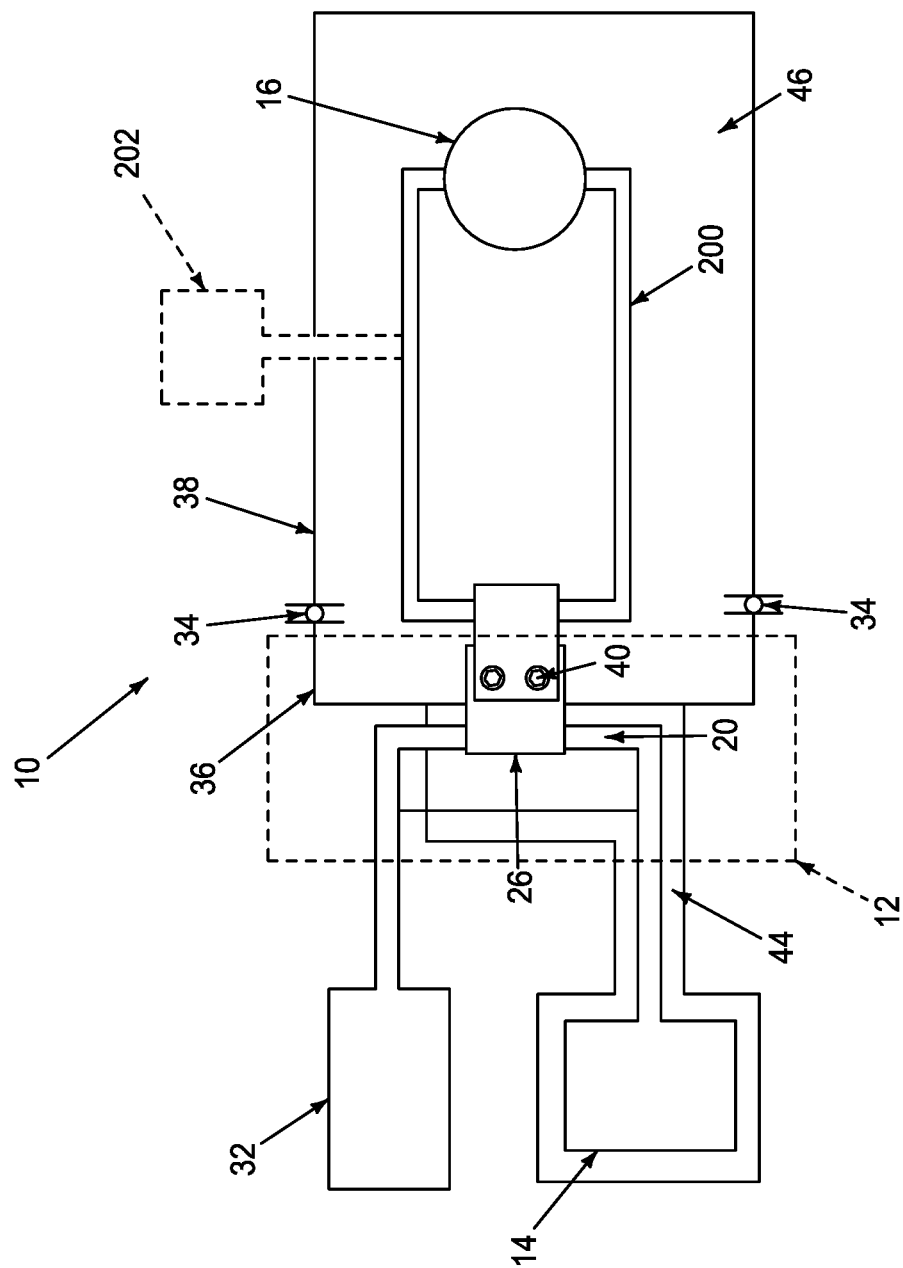
FIG. 6B is a cryogenic analysis system according to another embodiment of the disclosure.

FIG. 6A depicts an embodiment having a configuration with the cryogenic fluid conduit across thermal connection vacuum housing 36, with a portion of the cryogenic fluid conduit 20 in a cryogenic fluid source vacuum space 44 and another portion in an analysis component vacuum space 46. As shown in FIG. 6B, in accordance with another embodiment of the disclosure, cryogenic fluid conduit 20 may be predominantly located in cryogenic fluid source component vacuum space 44 (i.e. not crossing the thermal connection vacuum housing 36) with a portion of thermal mass 26 in each of cryogenic fluid source component vacuum space 44 and analysis component vacuum space 46.

Figure 7:
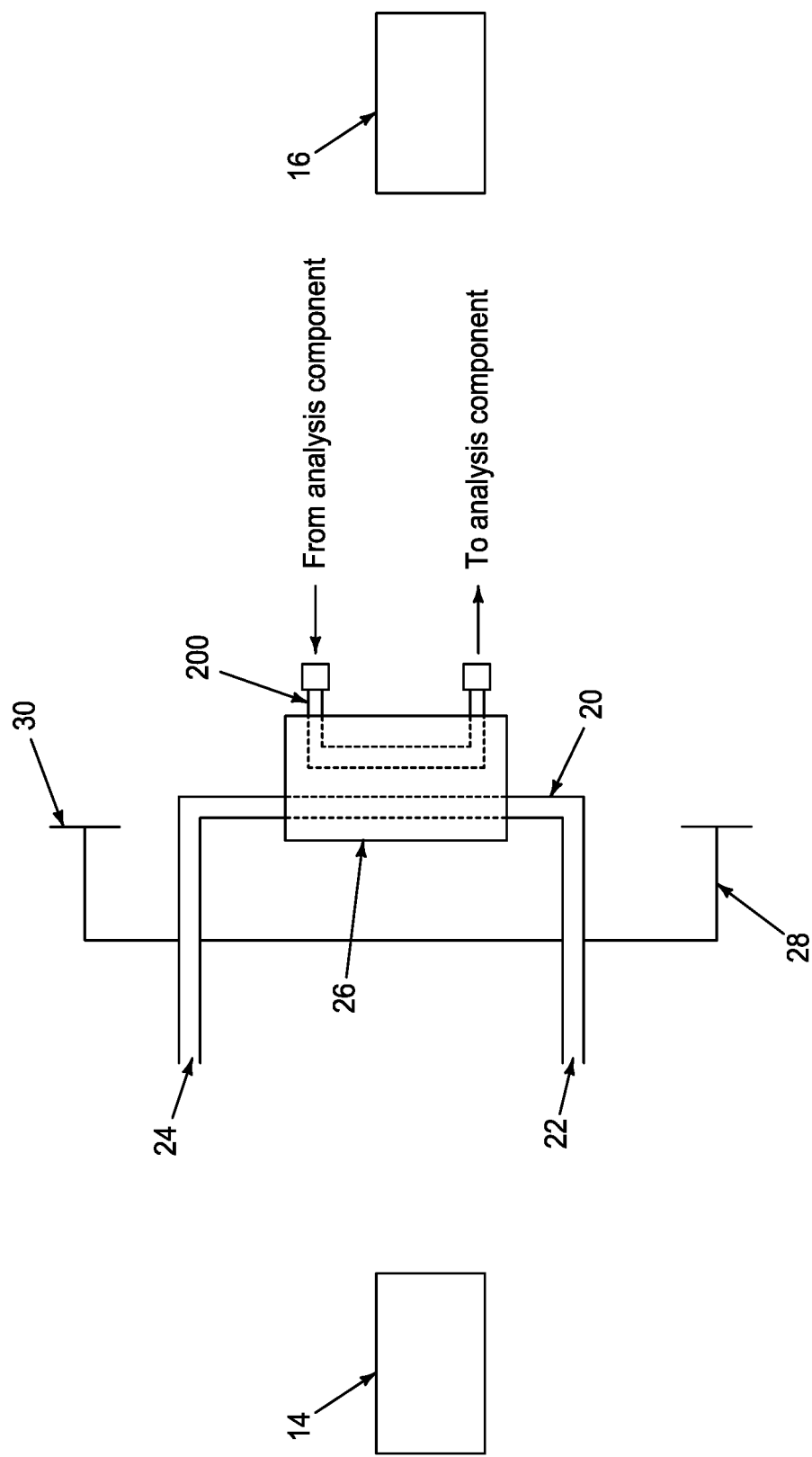
FIG. 7 is a thermal connection assembly according to an embodiment of the disclosure.

Referring next to FIG. 7, another embodiment of thermal connection assembly 12 is depicted that provides thermal communication between a thermal mass 26 of thermal connection assembly 12 to analysis component 16 via the transfer of cryogenic fluid from thermal mass 26 to analysis component 16. This embodiment can include a secondary cryogenic fluid conduit 200 that is separate from the cryogenic fluid conduit 20. This can provide for the use of a different cryogenic fluid in cryogenic fluid conduit 20 vs. that used in the secondary cryogenic fluid conduit 200. Connections to the secondary cryogenic fluid conduit could be a VCR connection for example consisting of a crush washer that seals between threaded male and female fittings.

Figure 8A:
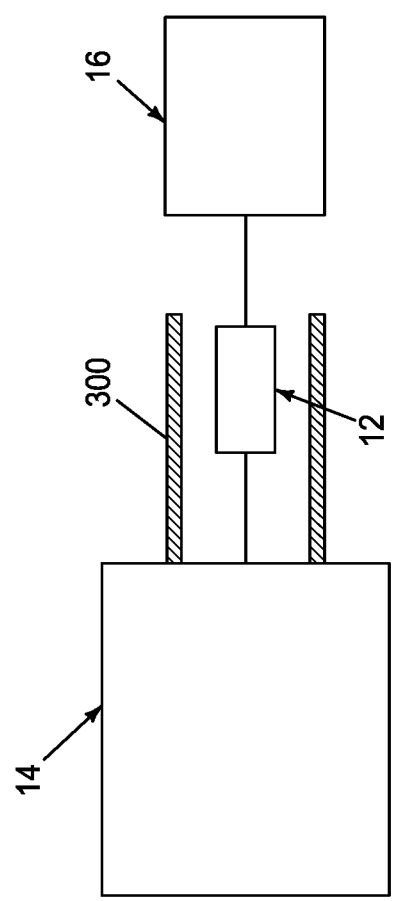
FIG. 8A is a cryogenic analysis system according to another embodiment of the disclosure.
Figure 8B:
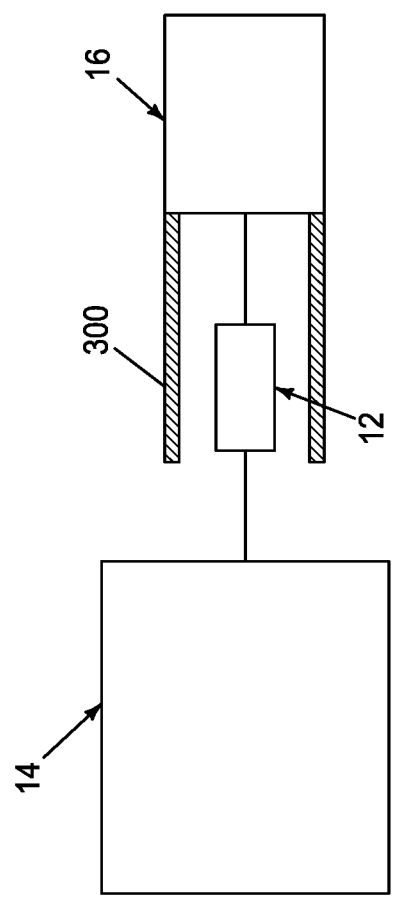
FIG. 8B is a cryogenic analysis system according to another embodiment of the disclosure.

Referring next to FIGS. 8A and 8B, Thermal connection assembly 12 may have a radiation shield(s) 300 that minimizes radiation heat transfer to and from the thermal connection assembly 12. For example, the radiation shield may reduce heat loads from a room temperature vacuum housing onto the thermal connection assembly 12. In one embodiment shown in FIG. 8A, the radiation shield is in thermal communication with the cryogenic fluid source component 14. In another embodiment, shown in FIG. 8B, the radiation shield is in thermal communication with the analysis component 16.

Figure 9:
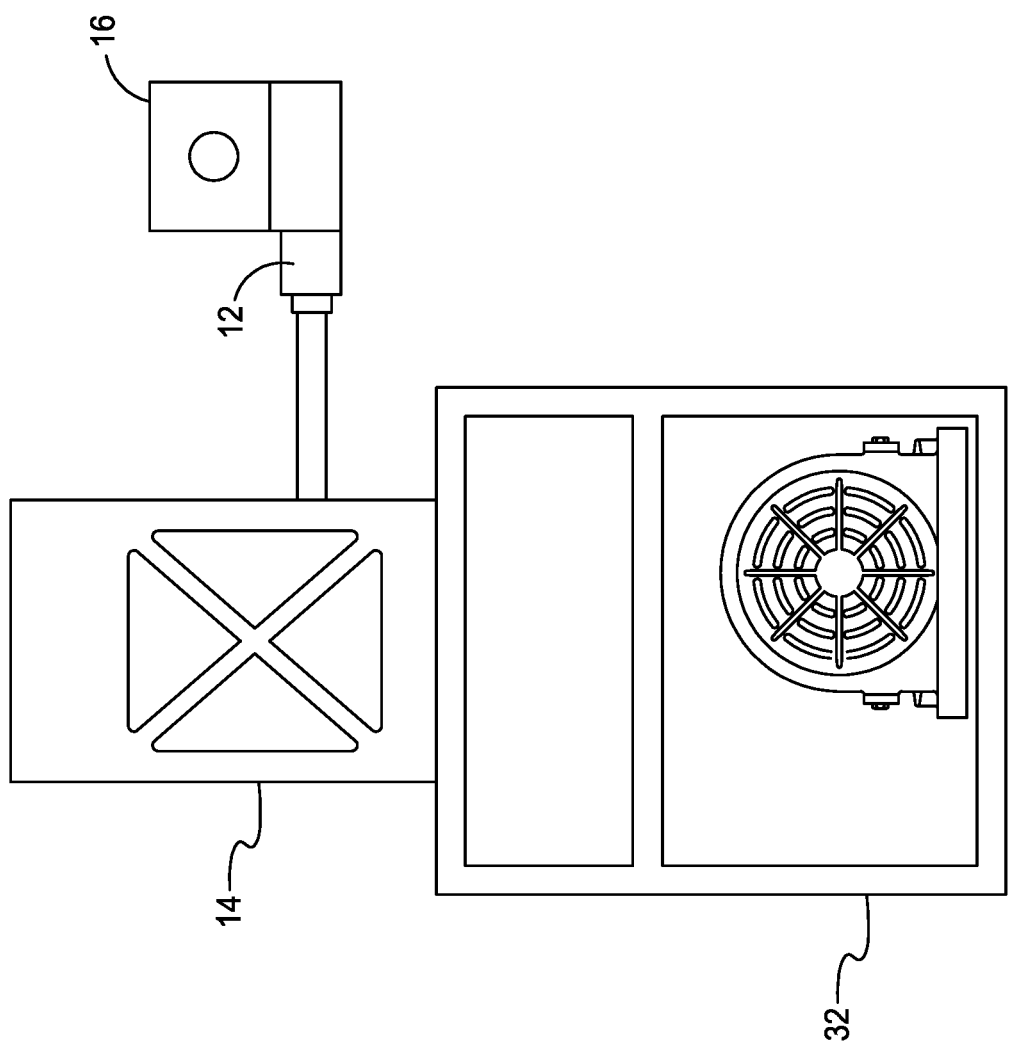
FIG. 9 is a cryogenic analysis system according to an embodiment of the disclosure.
Figure 10:
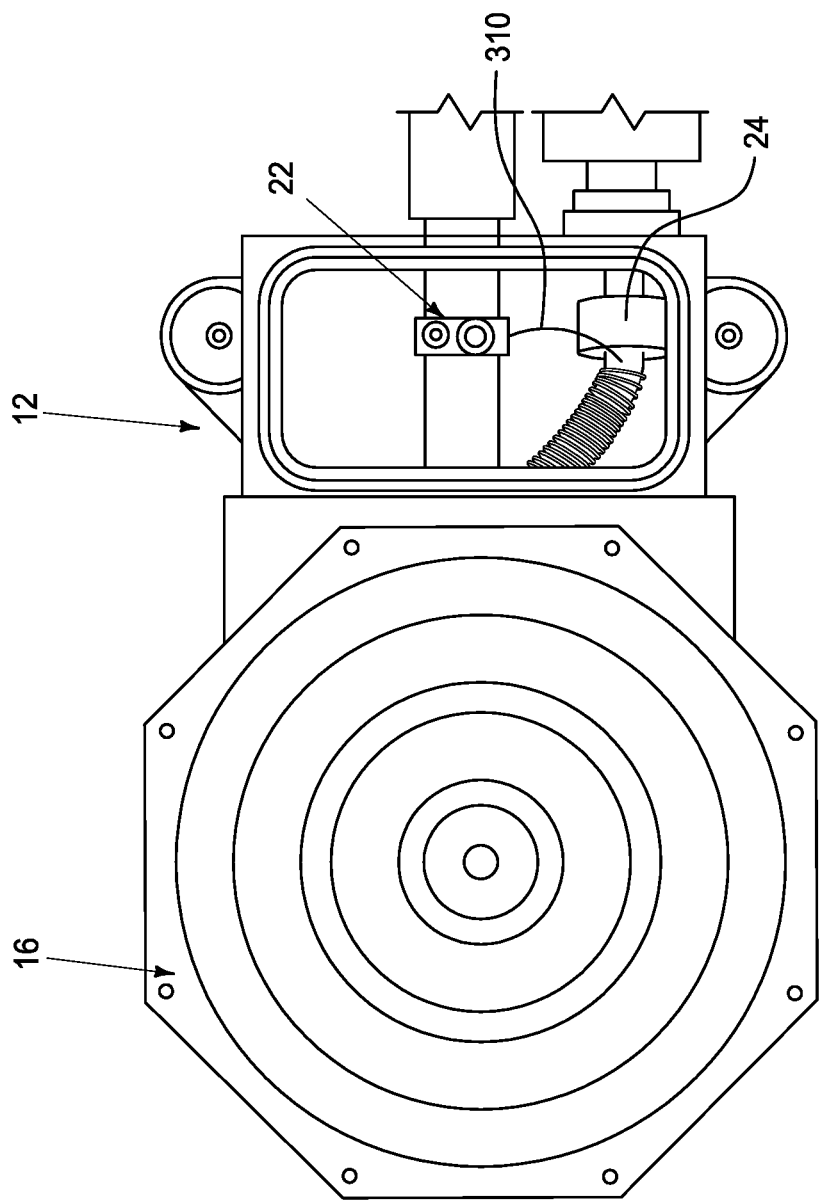
FIG. 10 is a more detailed view of components of the cryogenic analysis system of FIG. 9.
Figure 11:
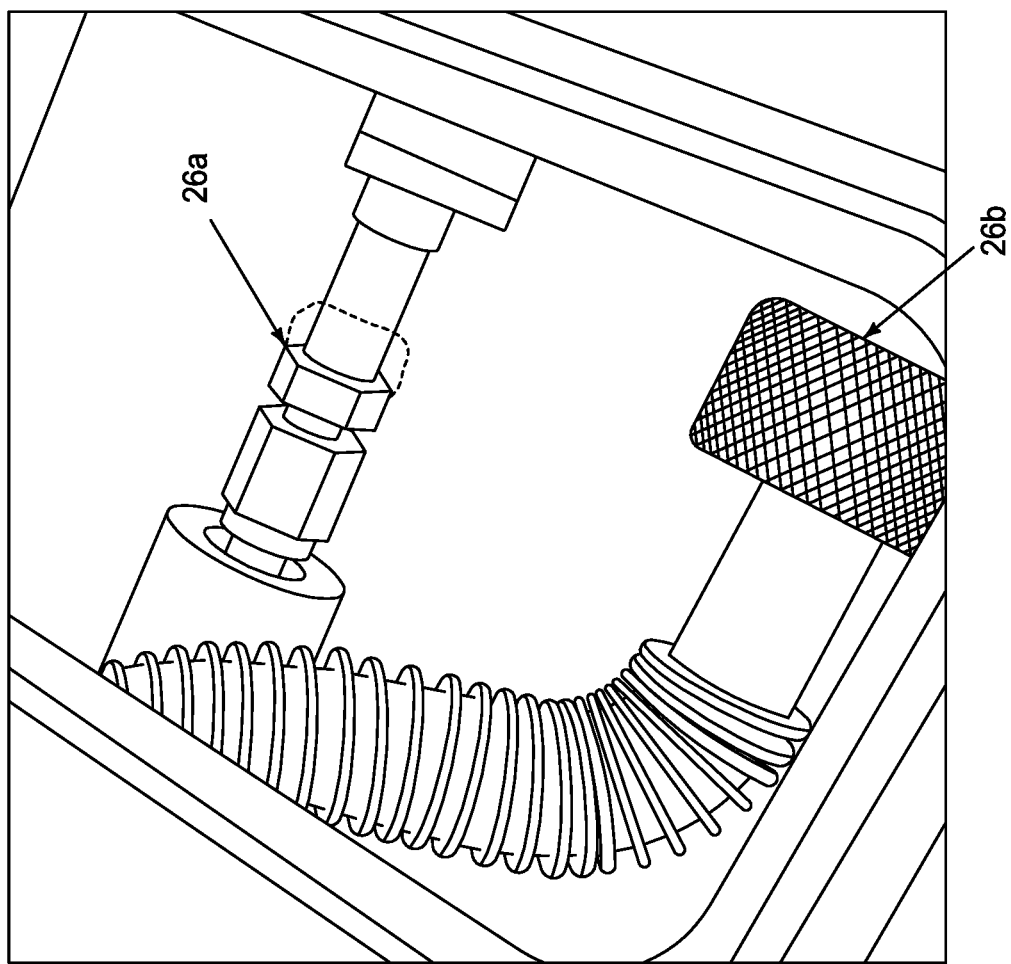
FIG. 11 is a more detailed view of the components of FIG. 10.

Referring next to FIGS. 9-11, liquid helium can be transferred from a cryogenic fluid source 14, through a mass 26a (to which wires 310 for heater and thermometer are attached) on the inlet side 22 of a thermal connection assembly 12, to an analysis component 16, through a mass 26b on the outlet side 24 of thermal connection assembly 12, and finally to a gas handling system 32 in a closed loop fashion.

The systems and/or methods of the present disclosure can provide for a high degree of custom analysis components all using the same cryogenic cold source. This can allow a user to retroactively upgrade analysis components, and/or allow the user to relatively quickly and with relative ease, interchange components.

The methods and/or systems of the present disclosure can be compatible with open-cycle or closed-cycle systems, with dewars or liquefiers, with any cryogenic fluid (helium, nitrogen, liquid, gas).

The thermal connection assembly can be configured to be universally adaptable in size, mechanically decoupled from the cryogenic fluid source to reduce vibrations transferred to analysis component. Additionally, the cryogenic fluid source can simply be sold as "cold source" for users to design their own analysis components. Accordingly, analysis components can be attached to different cryogenic fluid sources of varying base temperature and cooling power. Together, this can provide for mobility of analysis components (cryogenic fluid source are static), mobility of cryogenic fluid source (analysis components are static), and/or one cryogenic fluid source to transfer thermal energy to multiple analysis chambers.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A cryogenic analysis system comprising:
   a cryogenic fluid source component;
   an analysis component;
   a thermal connection assembly operably engaged with both the cryogenic fluid source component and the analysis component to provide disengagement or engagement of the cryogenic fluid source component to/from the analysis component while maintaining the cooling status of the cryogenic fluid source component; and
   either a thermally conductive conduit or a cryofluid conduit extending from the thermal connection assembly to the analysis component.

2. The cryogenic analysis system of claim 1 wherein the cryogenic fluid source and the thermal connection assembly share a housing.

3. The cryogenic analysis system of claim 2 wherein the shared housing is distinct from analysis component housing.

4. The cryogenic analysis system of claim 1 further comprising a radiation shield about the thermal connection assembly.

5. The cryogenic analysis system of claim 4 wherein the radiation shield extends from the cryogenic fluid component.

6. The cryogenic analysis system of claim 4 wherein the radiation shield extends from the analysis component.

7. The cryogenic analysis system of claim 1 wherein the analysis component and the thermal connection assembly share a housing.

8. The cryogenic analysis system of claim 7 wherein the shared housing is distinct from cryogenic fluid housing.

9. The cryogenic analysis system of claim 1 further comprising a first housing about the cryogenic fluid source component, and a second housing about the analysis component, wherein the first and second housing are distinct from one another.

10. The cryogenic analysis system of claim 1 further comprising a cryofluid conduit extending from the cryofluid source to the thermal connection assembly.

11. The cryogenic analysis system of claim 1 further comprising a fluid conduit extending from the thermal connection assembly to a gas handling system.

12. The cryogenic analysis system of claim 1 wherein the thermal connection assembly comprises at least two thermal masses, each thermal mass having a different temperature, wherein each of the thermal masses are in thermal communication with distinct portions of the analysis component having different temperatures.

\* \* \* \* \*